(12) United States Patent
Moss

(10) Patent No.: US 7,513,054 B2
(45) Date of Patent: Apr. 7, 2009

(54) CONSTRUCTION LAYOUT AND ANGLE MEASUREMENT TOOL

(76) Inventor: John B. Moss, 4520 Rhonda Sue, Imperial, MO (US) 63052

( * ) Notice: Subject to any disclaimer, the term of this patent is extended or adjusted under 35 U.S.C. 154(b) by 0 days.

(21) Appl. No.: 11/931,183

(22) Filed: Oct. 31, 2007

(65) Prior Publication Data

US 2008/0052938 A1 Mar. 6, 2008

Related U.S. Application Data

(63) Continuation of application No. 11/359,991, filed on Feb. 22, 2006, now Pat. No. 7,299,559, which is a continuation of application No. 10/915,761, filed on Aug. 11, 2004, now Pat. No. 7,051,446.

(60) Provisional application No. 60/573,967, filed on May 24, 2004.

(51) Int. Cl.
B43L 7/00 (2006.01)
(52) U.S. Cl. .............................. 33/429; 33/423; 33/640
(58) Field of Classification Search .................. 33/429, 33/365, 391–392, 404, 407–409, 413–414, 33/418, 420–421, 423–424, 426, 465, 474, 33/476, 481
See application file for complete search history.

(56) References Cited

U.S. PATENT DOCUMENTS

| | | | |
|---|---|---|---|
| 2,278,440 A | 4/1942 | Graves | |
| 4,189,844 A | 2/1980 | Riggins, Sr. | |
| 4,805,315 A | 2/1989 | Nesbitt | |
| 5,121,553 A | 6/1992 | Boerder | |
| 5,170,568 A | 12/1992 | Wright | |
| 5,187,877 A | 2/1993 | Jory et al. | |
| 5,239,762 A | 8/1993 | Grizzell | |
| 5,727,325 A | 3/1998 | Mussell | |
| 6,122,834 A | 9/2000 | Rester | |
| 6,243,961 B1 | 6/2001 | Winski | |
| 6,260,283 B1 | 7/2001 | Abernathy et al. | |
| 6,293,028 B1 | 9/2001 | Sylvia | |
| 6,374,504 B1 | 4/2002 | Graham | |
| 6,408,529 B1 | 6/2002 | Hodges | |
| 6,467,179 B1 | 10/2002 | Wolf | |
| 6,494,015 B1 | 12/2002 | Critchlow | |
| 6,578,278 B2 | 6/2003 | Siefert | |
| 6,622,394 B2 | 9/2003 | Werner et al. | |
| 6,688,014 B1 | 2/2004 | Allemand | |
| 6,725,555 B1 | 4/2004 | Moore | |
| 6,758,016 B2 * | 7/2004 | Gobeil .................... 52/191 |
| 2002/0144420 A1 | 10/2002 | Mora | |
| 2003/0204963 A1 | 11/2003 | Siefert | |

* cited by examiner

*Primary Examiner*—G. Bradley Bennett
*Assistant Examiner*—Tania C Courson
(74) *Attorney, Agent, or Firm*—Armstrong Teasdale LLP

(57) ABSTRACT

A construction layout and angle measurement tool includes opposite working sides having unique indicia for establishing angles from side edges or corners of building materials. When used with a reference line, and when attached to the workpiece, the tool allows site layout and evaluation by only one person. The tool may be mounted on vertical, horizontal, and inclined workpieces. Angles are determined and evaluated directly with the tool while avoiding mathematical computation.

37 Claims, 17 Drawing Sheets

* THIS ILLUSTRATION SHOWS THE PURPOSE OF CUTS BEING ESTABLISHED ON THE FOLLOWING PAGE. THE NUMBERS ON THE BUILDING CORRESPOND WITH THE NUMBERED CUTS ON THE NEXT PAGE TO SHOW THE BASIC ROOF PITCH CUT CAPABILITIES USING A CHALKLINE.

CONSTRUCTION LAYOUT AND ANGLE MEASUREMENT TOOL

CROSS REFERENCE TO RELATED APPLICATIONS

This application is a continuation of U.S. application Ser. No. 11/359,991 filed Feb. 22, 2006 and now issued U.S. Pat. No. 7,299,559, which is a continuation application of U.S. application Ser. No. 10/915,761 filed Aug. 11, 2004, now issued U.S. Pat. No. 7,051,446 which claims the benefit of U.S. Provisional Application Ser. No. 60/573,967 filed May 24, 2004, the subject matter of which is hereby incorporated by reference in its entirety.

BACKGROUND OF THE INVENTION

This invention relates generally to tools, and more specifically to layout and evaluation tools used for construction projects.

A variety of tools exist which are used to layout construction sites and evaluate existing structures or construction projects in progress. Carpenters, for example, are often charged with layouts and construction of various projects. For example, wall framing and finishing, roofline construction and finishing, banister and railing construction, patio and deck construction, and framing for sidewalks, pathways, and the like often require great attention to design details which carpenters, among others, must incorporate into the final construction. One problem which carpenters must face is accurate and efficient location of angles and distances in laying out construction sites, and in cutting construction materials to complete projects.

A variety of tools exist which carpenters presently use to measure angles for layout of construction sites and fabrication of structures. For example, roofing or framing squares and various protractor tools are available which allow carpenters and construction tools to measure angles for site layout and to mark construction pieces for cutting during fabrication of a structure. Such known angle measuring tools are, however, disadvantaged in several aspects.

For example, except for very small layouts and small construction components, it typically takes two workers to layout sites, measure larger pieces for fabrication, and evaluate existing constructions or constructions in progress. One worker is typically needed to hold the measuring tool at a predetermined location, while another worker is needed to extend a string line to a location some distance away from the tool. In a cooperative manner, the worker with the measuring tool directs the worker with the string line to adjust the position of the string until the desired angle is obtained, and then to set a marker on the site (e.g., a stake or a flag) or to mark a construction workpiece for cutting. For various reasons, however, it is not always easy to dedicate two workers to such tasks, and it would be desirable if such tasks could be efficiently performed by only one person, potentially saving time and expense for construction projects.

Additionally, existing tools are generally designed for use in one particular orientation by the user (e.g., measurement from a horizontal edge). If a user attempts to use the tool in another orientation (e.g., measurement from a vertical position), the user must adapt and use the tool differently, sometimes requiring mathematical computation or adjustment to the reading of the tool to measure or mark certain angles. It would be desirable to provide a tool which may be more or less universally used in the same manner in a variety of positions and orientations by the user, thereby simplifying use of the tools and prevent mistakes due to mathematical errors.

Still further, when evaluating existing structures for improvement, repair, or finishing work, known layout and measuring tools are not that helpful in determining angles. For example, on-site determination of the pitch of a roof, an unknown angle between two elements, or the centerline of a circle or arc is generally determined by measurement of distances and mathematical formulas, and not by direct measurement with tools. It would be desirable to provide a tool that is more capable of directly evaluating existing structures without mathematical computation.

BRIEF DESCRIPTION OF THE INVENTION

According to an exemplary embodiment, an angle measurement and layout tool is provided. The tool comprises a support portion configured to seat against an edge of a construction workpiece, and a guide portion extending from the support portion. The guide portion has opposite faces with each face having measurement indicia thereon, and the measurement indicia is differently arranged on each of the opposite faces.

Optionally, the support portion may comprise a corner bracket, and the support portion may be configured to be attached to an edge of the construction workpiece. The support portion may include a first slot and a second slot spaced from the first slot, the first and second slots positioned relative to a respective one of the opposite faces of the guide portion to accurately measure angles when a reference line is extended from each of the first and second slots to the corresponding face of the guide portion. At least one extension arm attachable to the corner bracket may be provided, with a portion of the extension arm extending parallel to the ledge.

According to another exemplary embodiment a construction layout tool is provided. The tool comprises a support portion configured to seat against an edge of a construction workpiece, and the support portion comprises a flat ledge and a corner bracket. A guide portion extends from the support portion, and the guide portion has layout measurement indicia thereon.

According to another exemplary embodiment, a construction layout and angle measurement tool is provided. The tool comprises a support portion comprising a flat ledge and a corner bracket extending from the ledge. Each of the ledge and corner bracket define a slot for a reference line, and the slots of each of the ledge and the corner bracket are different from one another. A guide portion extends from the support portion, and the guide portion has opposite faces each having layout measurement indicia thereon. The measurement indicia of one of the faces corresponds to the slot of the ledge, and the measurement indicia of the other of the faces corresponds to the slot of the corner bracket, wherein when a reference line is extended through one of the slots and across the corresponding face of the guide portion, the orientation of the line with respect to the guide portion may accurately establish a desired layout or determine an unknown layout.

In yet another embodiment, an angle measurement and layout tool is provided. The tool comprises a support portion configured to receive a corner of a workpiece, and a guide portion extending from the support portion and marked with measurement indicia corresponding to the corner of the workpiece. The measurement indicia include at least one of an angular degree indicia and slope indicia.

DETAILED DESCRIPTION OF THE INVENTION

Figure 1:
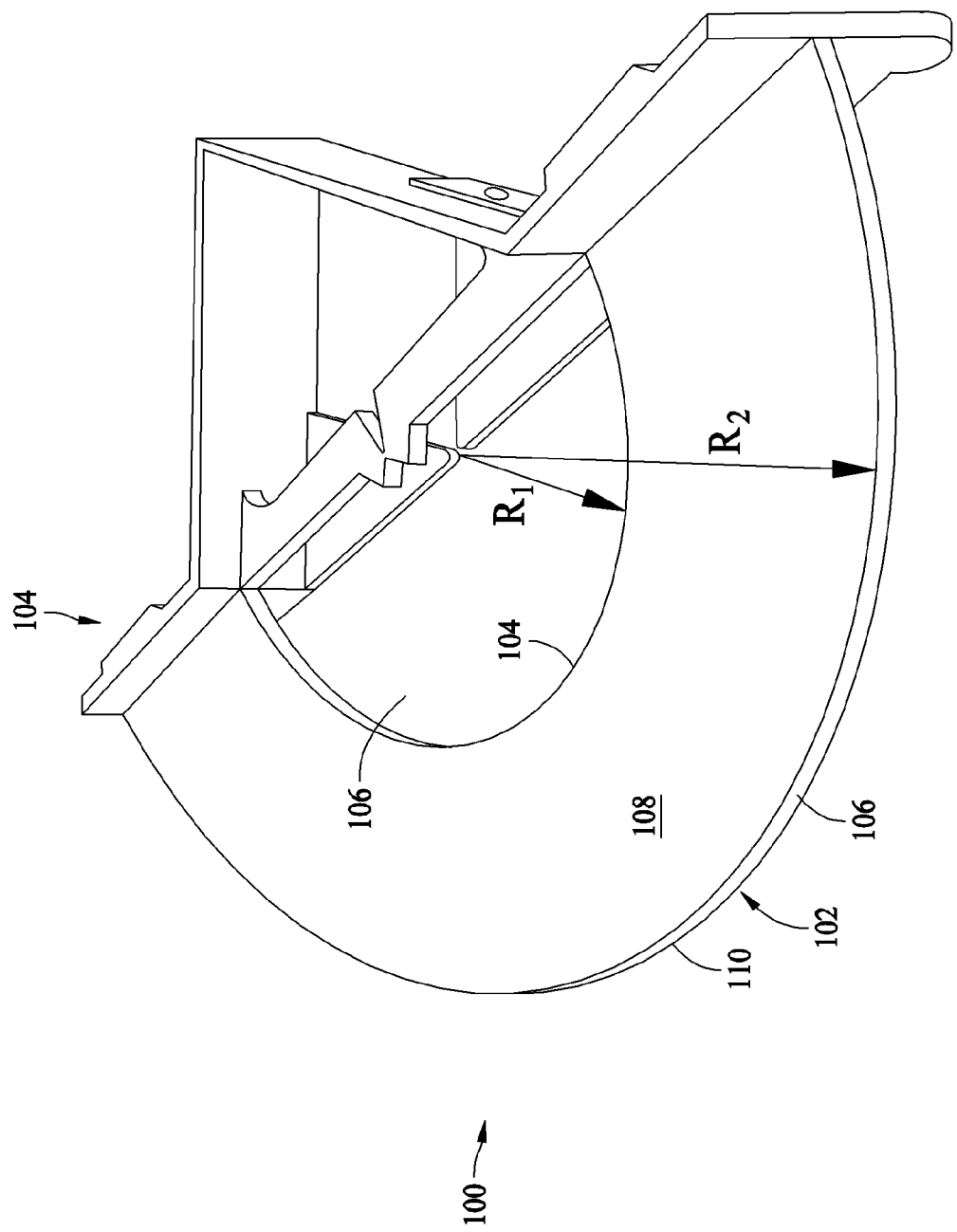
FIG. 1 is a perspective view of an exemplary layout and angle measurement tool.

FIG. 1 is a perspective view of an exemplary layout and angle measurement tool 100 which may be used by carpenters, builders and construction workers, among others, to efficiently lay out construction sites, to evaluate existing structures and construction in progress, as well as permit efficient fabrication of construction projects by facilitating marking and cutting lines for construction workpieces, including but not limited to common building materials such as plywood, lumber, drywall, plastic and metallic materials widely used in construction projects of all kinds. As explained below, the tool 100 is a multi-task angle measuring device which may be used by only one person to find and establish desired angles when used with a common string, chalk line, or plumbob (not shown in FIG. 1).

For the reasons explained below, and unlike known tools, the tool 100 may be capably used by one person to, among other things, quickly approximate construction site layouts without the need or assistance of another person; snap lines with a chalk line at angles and pitches on common building materials along straight edges or from a 90° corner of the materials without the aggravation of the chalk-line clip sliding or falling off the mark; find unknown angles from one point to another over short or long areas depending on length of string used with the tool; establish known angles; find an unknown actual degree of incline when using a plumbob with the toil; find an unknown roof pitch quickly and easily; find a centerline of a circle or a construction arc; provide an anchor, (even along a vertical edge), for a chalk line clip or a plumbob; function as a level along a horizontal plane when used with a plumbob; and allow hands free use of the tool. The versatile tool 100 simplifies construction layout, fabrication and evaluation tasks by directly finding and establishing desired angles and key points for construction purposes without requiring time consuming mathematical computation and creative use and adaptation of existing tools to determine angles, slopes and key construction parameters, thereby avoiding potential mistakes associated with mathematical computation and known tools. The tool may be rather universally used in a variety of positions (e.g., vertical, horizontal, and inclined positions) to accomplish a wide variety of tasks.

As illustrated in FIG. 1, the tool 100 includes a generally flat and planar guide portion 102 extending from a support portion 104. The guide portion 102 is generally annular in an exemplary embodiment and includes an inner edge 105 and an outer edge 106 which is spaced from the inner edge 105. The inner and outer edges 105, 106 of the guide portion 102 each extend as a substantially 180° arc having a constant radius R1 and R2, respectively forming semicircular edges of the guide portion 102. The inner edge 105 defines a semicircular opening 107 extending between the guide portion 102 and the support portion 104 of the tool 100. While the guide portion 102 is illustrated as having a rounded or arcuate shape, it is understood that the guide portion may be otherwise shaped in an alternative embodiment. Other geometric shapes and configurations may be employed in other embodiments while still achieving the benefits of the invention and without departing from the scope of the invention. The particular embodiments described herein are therefore provided for illustrative purposes only and are not intended to limit the tool 100 to any particular shape.

As explained in detail below, the guide portion 102 includes opposite faces 108 and 110 extending between the inner and outer edges 105 and 106. The faces 108 and 110 include markings or indicia (not shown in FIG. 1) which indicate angles, slopes, and other items of interest relative to a designated point of the support portion 104 explained below. Thus, when a reference line (not shown in FIG. 1), such as string or chalk line is coupled to the support portion 104 in the manner explained below, one of the faces 108 and 110 will indicate the angle of the reference line with respect to the tool 100 for quickly finding and establishing layouts for site layout or fabrication of construction projects.

As will become evident below, the tool 100 has two opposite working sides or faces. Each side is unique in application and script layout for measuring or determining angles, and each has its own individual pivot point or string slot to be used for that intended side or face. One side of the tool is for use on straight edges or baselines and the other side of the tool is for use on 90° corners.

Figure 2:
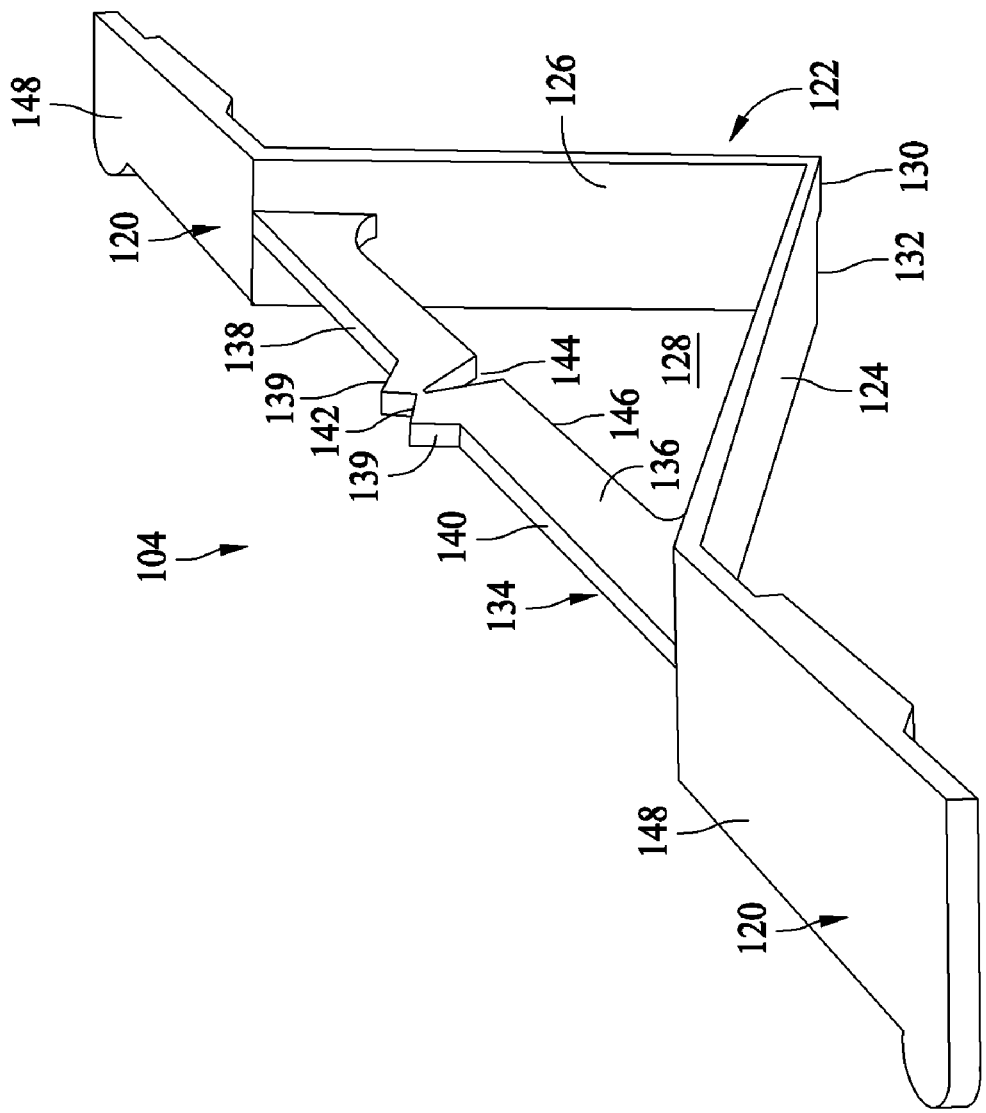
FIG. 2 is a perspective view of a portion of the tool shown in FIG. 1.

Referring now to FIG. 2, the support portion 104 includes substantially flat and parallel ledges 120 at either end thereof which extend substantially perpendicular to the plane of the guide portion 102 (shown in FIG. 1) in an exemplary embodiment. A corner bracket 122 extends between the ledges 120 of the support portion 104, and the corner bracket includes corner legs 124 and 126 which extend substantially perpendicular to one another and extend substantially at a 45° angle from the plane of the ledges 120 in an illustrative embodiment.

That is, the corner bracket 122 extends downward from the ledges 120 in a V-shaped configuration. The legs 124 and 126 of the corner bracket 122 are flat and smooth and define an opening or pocket 128 therebetween which may receive a corner of a sheet of building material as further explained below. An intersection 130 of the corner legs 124 and 126 includes a slot 132 which may receive an end of the reference line (e.g., string or chalk line) used with the tool 100.

A cross member 134 extends between the ledges 120 above the corner bracket 122, and in an exemplary embodiment, the cross member 134 is a beam having opposite faces 136 and 138 which extend parallel to the respective faces 108 and 110 of the guide portion 102 (shown in FIG. 1). Sight members 139 project upwardly from a top surface 140 of the cross member 134 and are triangular in shape in one embodiment. The sight members 139 include inwardly sloping sides which define a reference point 142 therebetween. The reference point 142 is centered relative to the guide portion 102 such that indicia on the faces 108 and 110 of the guide surfaces are referenced to the point 142 for accurately establishing and determining angles with the tool 100.

A slot 144 is formed in a lower edge 146 of the cross member 134, and the slot is substantially aligned with the reference point 142 such that when a reference line is received in the slot 144, the reference line substantially coincides with the reference point 142 for measuring an angle of the reference line with respect to the tool 100 using the guide portion 102. Additionally, the slot 132 in the corner bracket 122 is aligned with the reference point 142 on a radial centerline of the guide portion 102 and is located approximately a radial distance R1 (shown in FIG. 1) from the reference point 142. Thus, when the reference line is received in the slot 132, angles may be accurately measured, established, or determined using the guide portion 102. As will be explained below, one of the faces 108 and 110 is marked with indicia which is arranged to indicate to indicate an angle from the reference line in the slot 144, and other of the faces 108 and 110 is marked with indicia arranged to indicate to indicate an angle from the reference line in the slot 132.

The top surface 140 of the cross member 134 is substantially flush with a top surface 148 of the support ledges 120. That is, the top surface 140 of the cross member 134 is in the plane of the support ledges 120. The ledges 120 may therefore be seated against an edge of a workpiece (not shown) such as lumber, drywall, or plywood, to align the tool 100 with respect the workpiece, and the reference point 142 will likewise be located along the edge of the workpiece, while the sight members 129 extend over the surface of the workpiece and assist in aligning the reference point 142 with a location mark or tick mark on the workpiece, which shall be demonstrated in the exemplary applications of the tool 100 which are described below.

In one embodiment, each of the guide portion 102 and the support portion 104 are fabricated from metal (e.g., low gage steel), although it is appreciated that other suitable materials, whether metallic or non-metallic (e.g., a high strength plastic) may be used to fabricated the tool 100. The guide portion 102 and the support portion may be integrally formed in a unitary construction via, for example a known molding process using known materials. Alternatively, the support portion 104 may be separately fabricated from the guide portion 102, and the guide portion 102 may be fastened to the support portion 104 using, for example, spot welding or another known technique.

Figure 3:
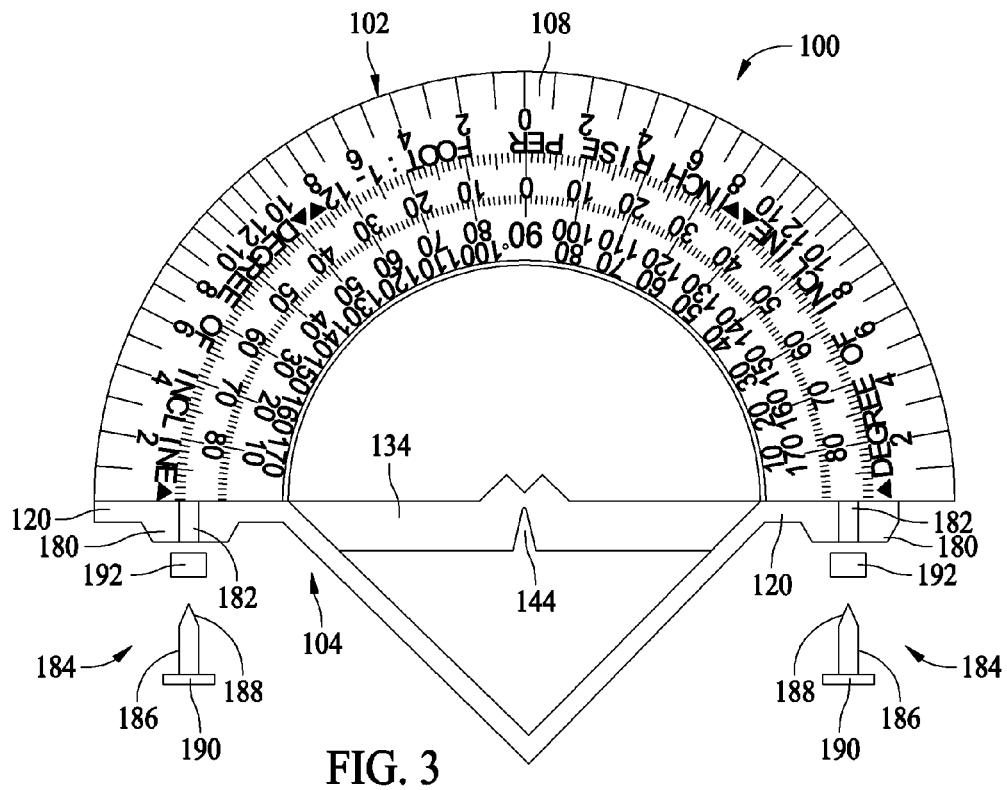
FIG. 3 is a top plan view of a first face of the tool shown in FIG. 1.

FIG. 3 illustrates in plan view the tool 100 with guide portion 102 extending upward from the support portion 104 and the face 108 of the guide portion 102 exposed for use. The face 108 includes markings and indicia which is described further below. When the tool 100 is positioned along a workpiece such that an edge of the workpiece abuts the support ledges 120 of the support portion 104 behind the guide portion 102, and further when a reference line is received in the slot 144 in the cross member 134, the angle of the reference line with respect to the tool 100 is indicated by the markings on the face 108 of the guide portion 102.

As also illustrated in FIG. 3, the tool 100 includes embossments 180 which are formed in the underside of the support ledges 120 of the support portion 104. The embossments 180 each include a threaded bore 182 extending through the respective ledge 120, and the bores 182 receive adjustable fastener assemblies 184 which may be used to anchor the tool 100 to a workpiece. In the exemplary embodiment, the fastener assemblies include a thumbscrew or threaded pin 186 having a point 188 on one end and a head 190 opposite the point 188. A spring element 192 extends around the pin 186 to provide a biasing counterforce to attachment of the pins 186 to the workpiece. The pins 186 are extended through the spring elements 192 and the pins 186 are coupled to the bores 182 with threaded engagement. When the pins 186 are rotated by turning the respective heads 196, the pins 186 may be advanced through the bores 182 toward the workpiece or pulled away from the workpiece.

As the points 188 of the pins 186 are advanced, depending on the hardness of the workpiece and the force or torque which turns the pins, the points 188 may pierce the edge of the workpiece and fasten the tool 100 to the workpiece. The spring elements 192 provide an outwardly directed bias force in the direction of arrow F in FIG. 3 so that, in the event that the pins 186 are only loosely attached to the workpiece, the spring elements 192 will detach the pins 186 from the workpiece. In essence, the spring elements 192 force the user to tighten the pins to the workpiece to a predetermined degree or to a minimum level of force based on the characteristics (e.g., the spring constant) of the spring elements 192, thereby fully and soundly seating the tool 100 and ensuring a sufficient anchoring force is present when the tool 100 is attached to a workpiece. Fastening of the tool to the workpiece may be of particular advantage when using the tool along a vertical or inclined edge of the workpiece.

While spring loaded pins are believed to be advantageously used as the fastener assemblies 184, it is recognized that other fasteners and mechanism could likewise be employed to fasten the tool 100 to a workpiece. In particular, clamping mechanisms may be advisable to secure the tool 100 to a metal workpiece, while the pins may be adequate for non-metallic materials.

Figure 4:
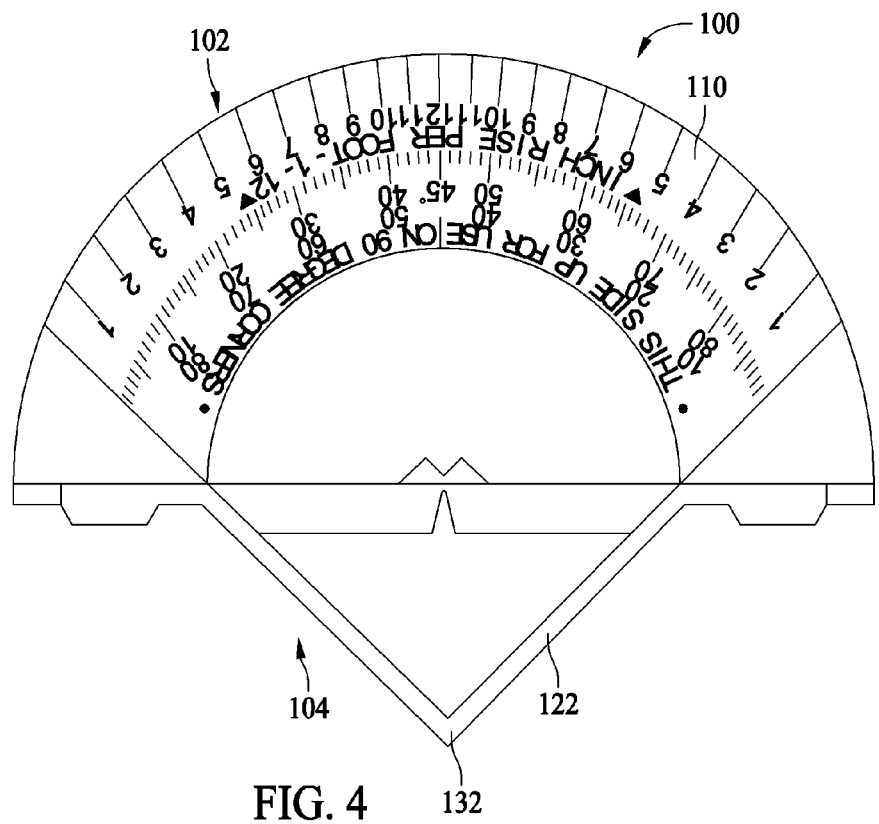
FIG. 4 is a top plan view of a second face of the tool shown in FIG. 1.

FIG. 4 illustrates in plan view the tool 100 with guide portion 102 extending upward from the support portion 104 and the face 110 of the guide portion 102 exposed for use. That is, FIG. 4 illustrates the opposite side of the tool 100 from FIG. 3. The face 110 includes markings and indicia which is described further below, and notably, the indicia on the face 110 is different in arrangement and in position from the indicia on the face 108 (shown in FIG. 3). When a corner of a workpiece (not shown in FIG. 4) is received in the corner bracket 122, and further when a reference line (not shown in FIG. 4) is received in the slot 132 in the corner bracket 122, the angle of the reference line with respect to the tool 100 is indicated by the markings on the face 110 of the guide portion 102. Thus, the face 110 employs a different attachment location (i.e., the slot 132) for the reference line than the face 108 (shown in FIG. 3) which employs the slot 144 in the cross member 134. The support portion should fully and soundly seat against the edge of a workpiece when laying out or determining angles to ensure an accurate reading of the tool 100.

Figure 5:
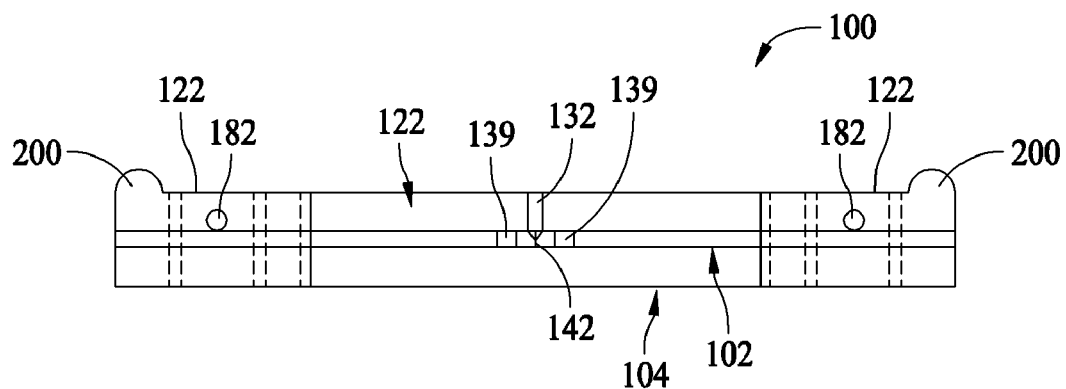
FIG. 5 is a front elevational view of the tool shown in FIGS. 1-4.
Figure 6:
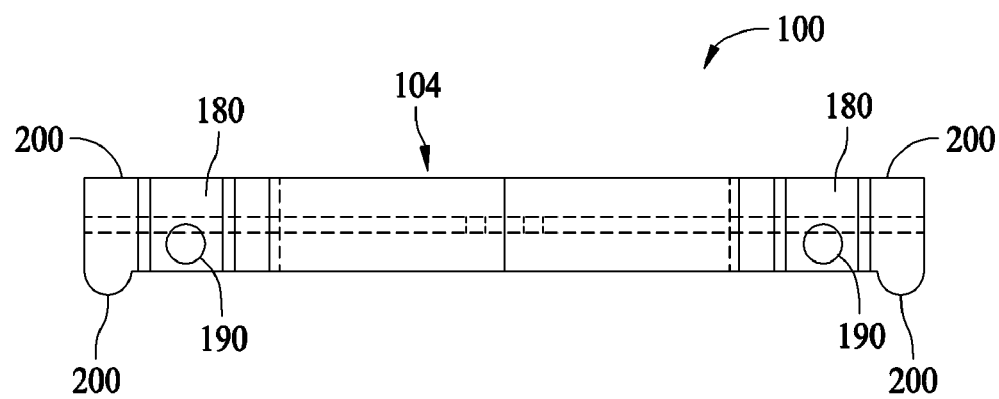
FIG. 6 is a rear elevational view of the tool shown in FIGS. 1-4.

FIGS. 5 and 6 are front and rear elevational views, respectively, of the tool 100. It is seen from FIG. 5 that the sight members 139 are aligned with the slot 132 of the corner bracket 122 and the bores 182 in the support ledges 120 containing the threaded pins 186 (shown in FIG. 3). Seating tabs 200 project outward from either end of the support portion 104, and the tabs 200 provide proper seating of the tool 100 when used along a vertical edge of a workpiece (not shown in FIG. 5). Additionally, the tabs 200 may align and position the tool 100 when held to the bottom of an incline such as a soffit, or to acquire a degree of incline such as a roof pitch, in the manner explained below. In FIG. 6, the heads 190 of the pins 186 (shown in FIG. 3) are seen protruding from the embossments 180 of the support ledges 120.

In a further embodiment, additional holes (not shown in FIGS. 5 and 6) may be formed in the support portion 104, and a user may "hard mount" the tool to a straight edge with screws or another known fastener for a stronger and sturdier connection of the tool to a workpiece.

Figure 7:
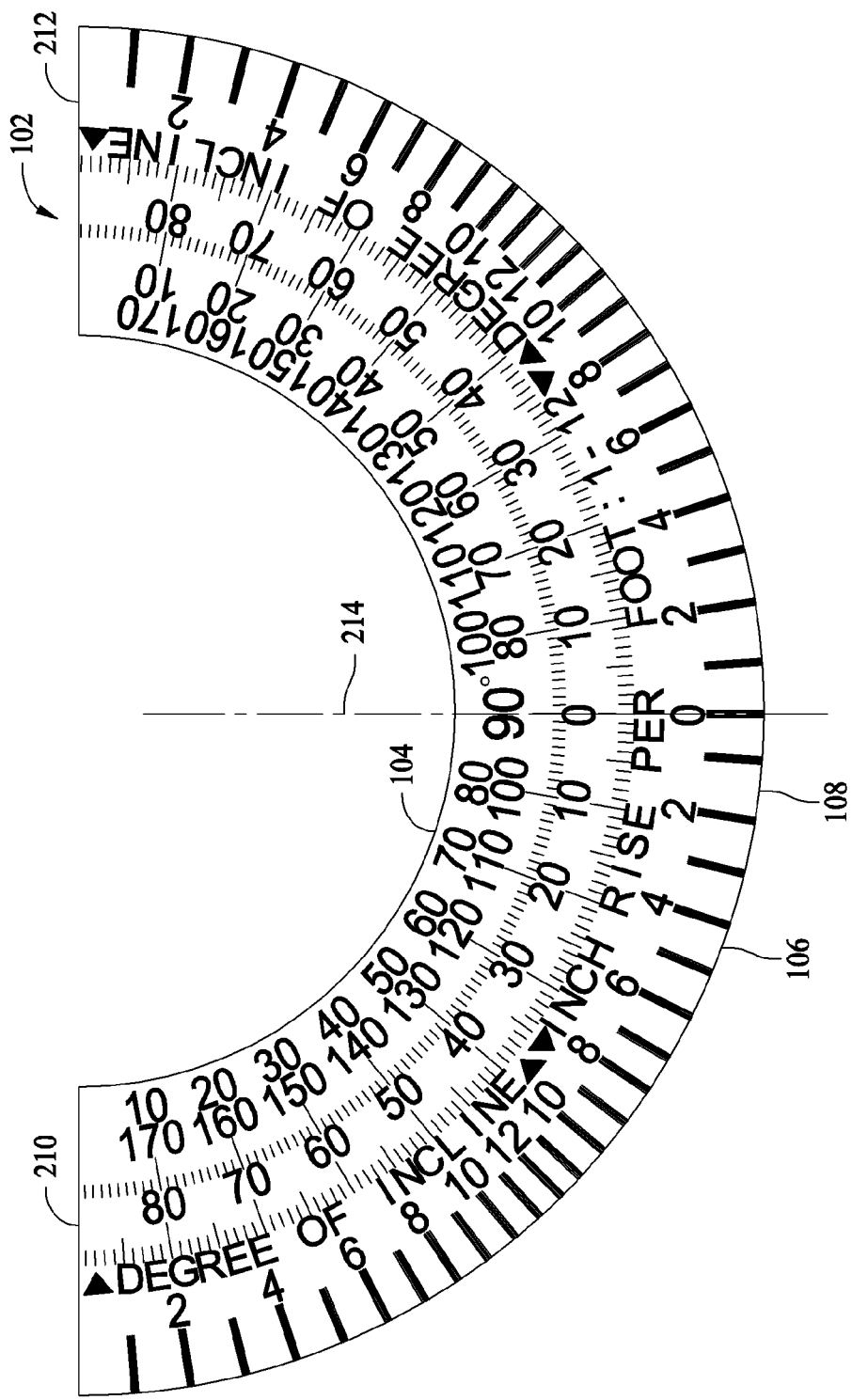
FIG. 7 is an enlarged view of a portion of the face shown in FIG. 3.

FIG. 7 illustrates the face 108 of the guide portion 102 in more detail, and particularly wherein exemplary indicia and marking of the face 108 is shown. In the exemplary embodiment, the face 108 includes angular degree indicia extending along the inner edge 105 of the guide portion 102, and slope indicia (expressed in, for example, inch rise per foot or degree of incline) along the outer edge 106. Further, for the user's convenience, and in acknowledgment of the tool being used in several different orientations or positions, several different varieties of each of the angular indicia and the slope indicia are provided. For example, and as illustrated in FIG. 7, a innermost scale of angular indicia is provided which indicates in incrementing marks or bar lines, an angle of 0° to 180° extending from a left hand edge 210 in FIG. 7 to a right hand edge 212 of the guide portion 102. An intermediate scale of angular indicia is provided adjacent the innermost scale and the intermediate scale indicates an angle of 0° to 180° extending from the right hand edge 212 to the left hand edge 210. A third or outermost scale of angular indicia, which also serves to indicate degree of incline, is provided which indicates an angle of 0° to 90° measured from a centerline 214 of the guide portion 102 to either of the left or right hand edges 210 and 212. Thus, angles may conveniently be measured, determined or established from left, right, and center positions when the tool is located on a workpiece.

The slope indicia begins at each of the left and right edges 210 and 212 and increments upward to 12 inches per foot (i.e., a 45° angle), and decreases back to a zero position coincident with the centerline 214 of the guide portion 102. Thus, slopes of inclines may conveniently be measured, determined or established from left, right, and center positions when the tool is located on a workpiece. The inch rise per foot/degree of incline conversion provided by the face 108 is user friendly for quick angle settings on circular and miter saws While exemplary indicia for the face 108 of the guide portion 102 has been described, it is understood that other indicia may desirable in alternative embodiments. By way of example, different gradations or increments of marking may be included to provide more or less detail in measuring capability of the tool. Likewise, metric units for slope may indicated, and while it is believed that slopes of greater than 12 inches per foot are unlikely to be encountered for most projects, greater ranges of slopes may be indicated. Further, additional indicia may be added which does not pertain to angular degrees or slopes or pitches of inclines but is nonetheless useful information to users.

Figure 8:
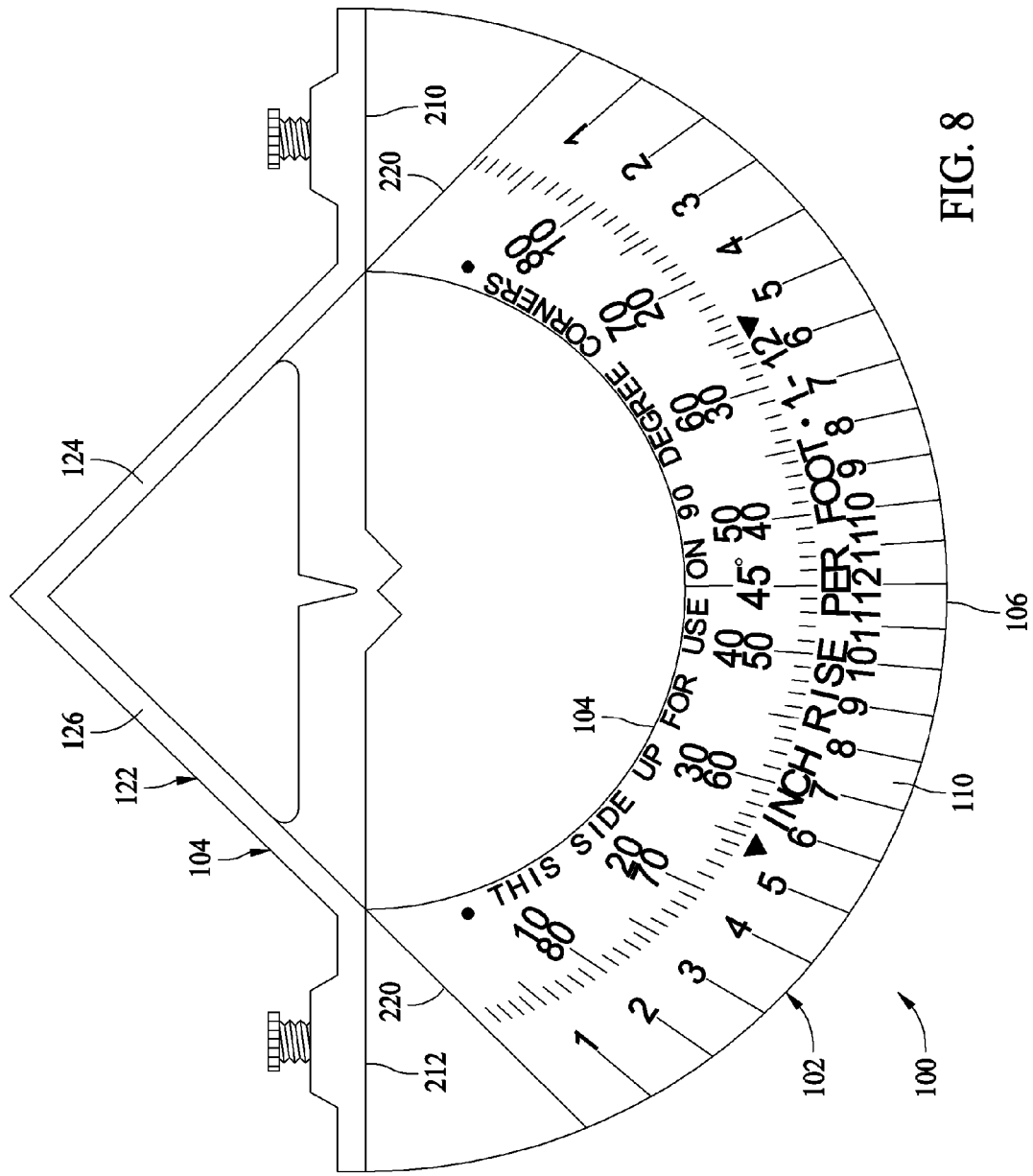
FIG. 8 is an enlarged view of a portion of the face shown in FIG. 4.

FIG. 8 illustrates the face 110 of the guide portion 102 in more detail, and particularly wherein exemplary indicia and marking of the face 110 is shown. In the exemplary embodiment, the face 110 includes angular degree indicia spanning only a portion of the guide portion 102 of the tool between the end edges 210 and 210 of the guide portion 102. Rather, boundary lines 220 of the indicia extend between the inner edge 105 and the outer edge 106 in a tangential relation to the corner legs 124 and 126 of the corner bracket 122. Thus, when the corner legs 124 and 126 are fitted to a corner of a workpiece, the boundary lines 220 match the side edges of the corner.

As illustrated in FIG. 8, angular degree indicia extends along the inner edge 105 of the guide portion 102, and slope indicia (expressed in, for example) inch rise per foot extends along the outer edge 106. Further, for the user's convenience, and in acknowledgment of the tool being used in several different orientations or positions, several different varieties of each of the angular indicia and the slope indicia are provided. For example, and as illustrated in FIG. 8, an innermost scale of angular indicia is provided which indicates in incrementing marks or bar lines, an angle of 0° to 90° extending from the left hand boundary line 220 in FIG. 7 to the right hand boundary line 220 of the guide portion 102. An outer scale of angular indicia is provided adjacent the innermost scale and the intermediate scale indicates an angle of 0° to 90° extending from the right hand boundary line 220 to the left hand boundary line 220. Thus, angles may conveniently be measured, determined or established from left or right positions when the tool is located on a workpiece.

The slope indicia begins at each of the boundary lines 220, increments upward to 12 inches per foot (i.e., a 45° angle), and decreases back to a zero position coincident with the centerline 214 of the guide portion 102. Thus, slopes or pitches of inclines may conveniently be measured, determined or established from left or right positions when the tool is located on a workpiece.

While exemplary indicia for the face 110 of the guide portion 102 has been described, it is understood that other indicia may desirable in alternative embodiments. By way of example, different gradations or increments of marking may be included to provide more or less detail in measuring capability of the tool. Likewise, metric units for slope may indicated, and while it is believed that slopes of greater than 12 inches per foot are unlikely to be encountered for most projects, greater ranges of slopes may be indicated. Further, additional indicia may be added which does not pertain to angular degrees or slopes or pitches of inclines but is nonetheless useful information to users.

The indicia shown in FIGS. 7 and 8 may be applied to the respective faces 108 and 110 in a known manner, including but not limited to printing techniques. Alternatively, the indicia may be formed integrally with the guide portion 102 in, for example, a known stamping, machining, molding, forging or engraving process. The indicia may include varying colors and style for point of emphasis and to include a variety of visual impressions to the user.

Figure 9:
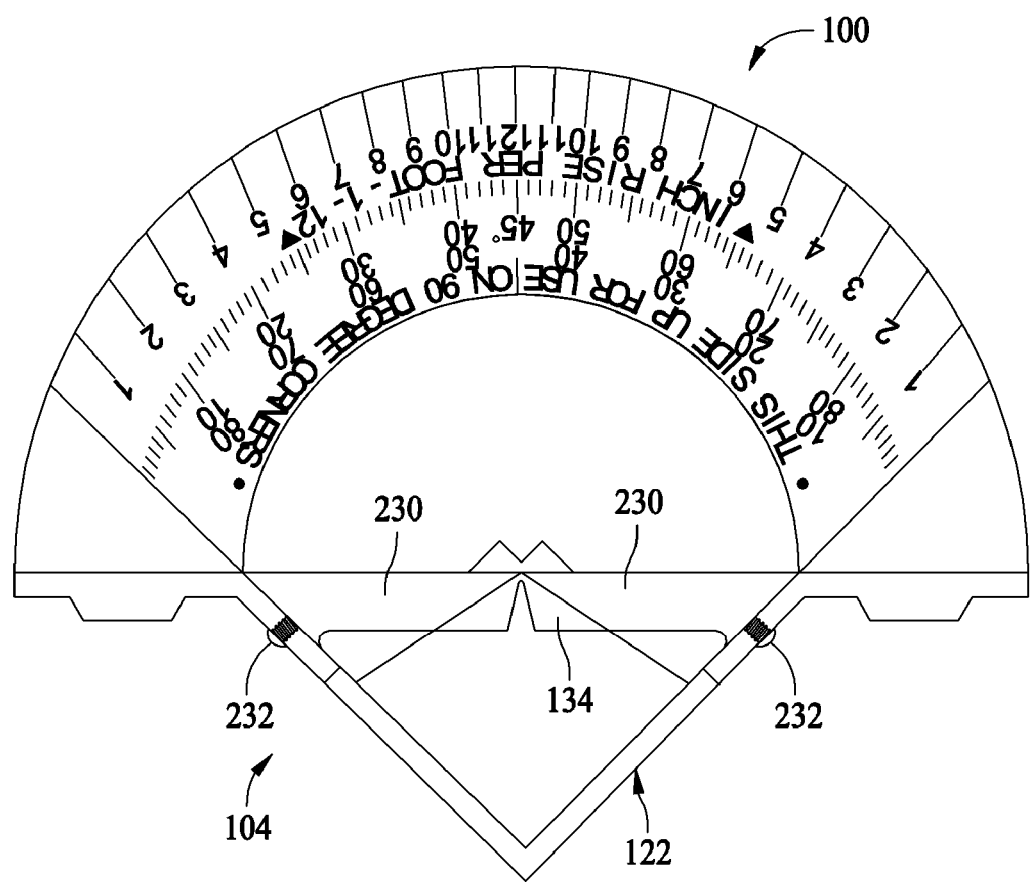
FIG. 9 is a partial top plan view of a further embodiment of a layout and angle measurement tool.

FIG. 9 illustrates the tool 100 including work area extension arms 230 which are coupled to the corner bracket 122 of the support portion 104. The work area extension arms 230 extend the mobility of the tool when the face 108 (shown in FIGS. 3 and 7) is used and the angle begins within for example, a distance from the corner of the workpiece which is less than the length of the cross member 134 (e.g., 2.5 inches in one embodiment). Without the arms 230 the tool will otherwise slip into the corner of the 90 degree area. If desired, the arms 230 may be removed by removing the attachment screws 232 which couple the arms 230 to the corner bracket 122.

Having now described the structure of the tool, the versatility of the tool 100 will now be demonstrated in various exemplary applications in which methods to establish, determine and evaluate angles, slopes, and pitches are believed to be apparent. More specifically, the tool 100 is designed to work in conjunction with a reference line (e.g. chalkline, string, wire, and the like), and has a vast array of possible applications which may be performed without the need of another person to assist with the other end of the line.

Figure 10:
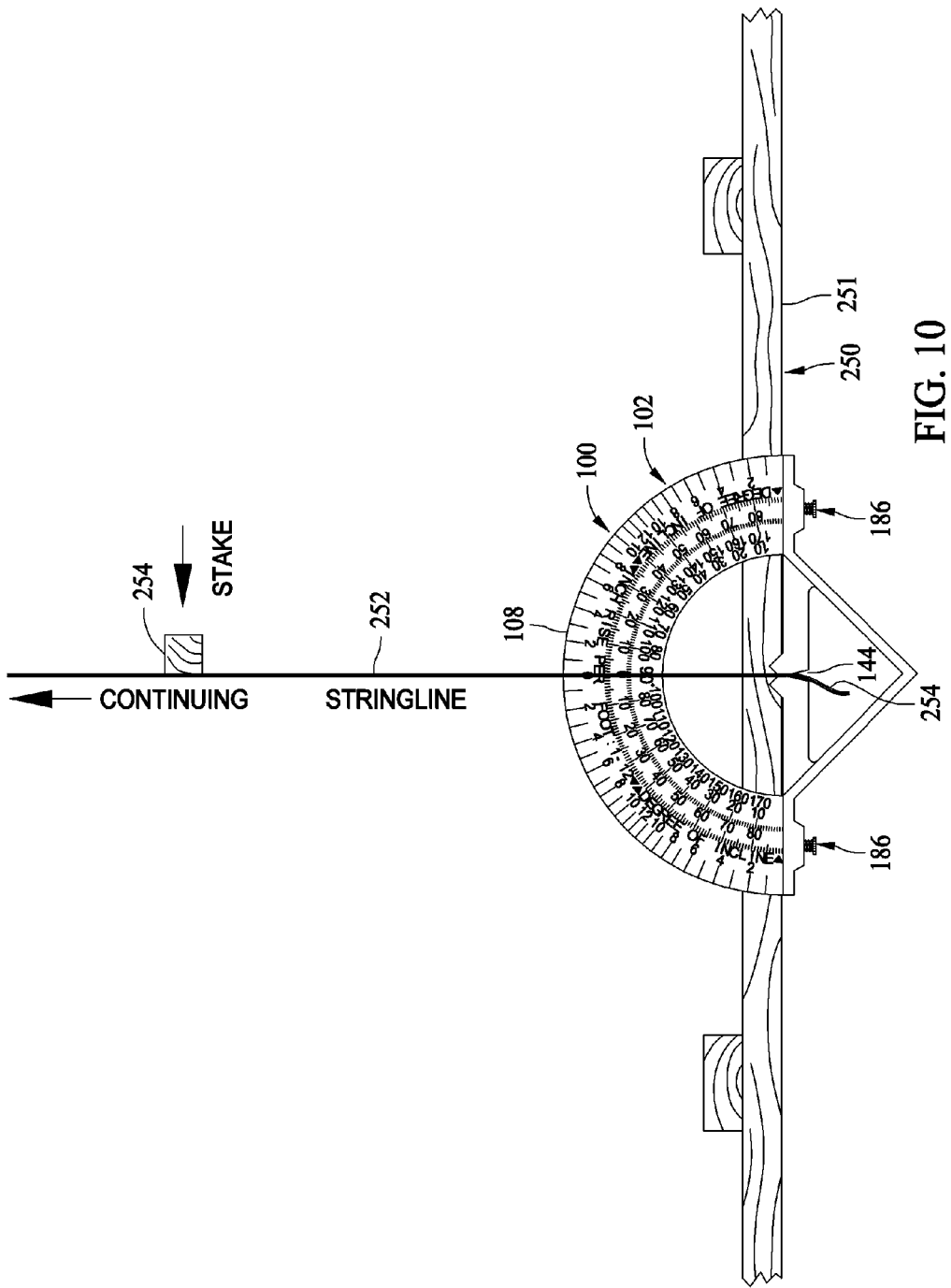
FIG. 10 illustrates a first exemplary application of a tool according to the present invention.

FIG. 10 illustrates an exemplary layout application wherein desired angles may be established on a job site. The tool 100 is mounted to a workpiece 250 via the pins 186 as described above to securely anchor the tool to the workpiece. As shown in FIG. 10, the workpiece is a piece of lumber which has been set in a desired location on, for example, the ground, and the tool 100 is seated along a straight edge 251 of the workpiece. Accordingly, the tool 100 is oriented with the face 108 exposed to the user.

A reference line 252 in the form of a string line is received in the slot 144 of the support portion, and a clip 253 attached to the string line maintains the line 252 coupled to the slot 144. In FIG. 10, a 90° angle is desired to be set from the workpiece 250, whereby the string line 252 is pulled taught and aligned against the 90° indicia on the face 108. When the line 252 is properly aligned with respect to the guide portion 102 at a 90° angle, a stake 254 may be driven into the ground to mark the 90° position. Once the stake 254 is set, 90° positions may be established over longer distances in a similar manner by pulling the line 252 taut against the stake 254 to set a new marker at a distance from the stake 254. Because the tool 100 is anchored to the workpiece, the user may work hands free of the tool, and thus one person may layout the appropriate angle once the tool 100 is mounted to the workpiece.

Figure 11:
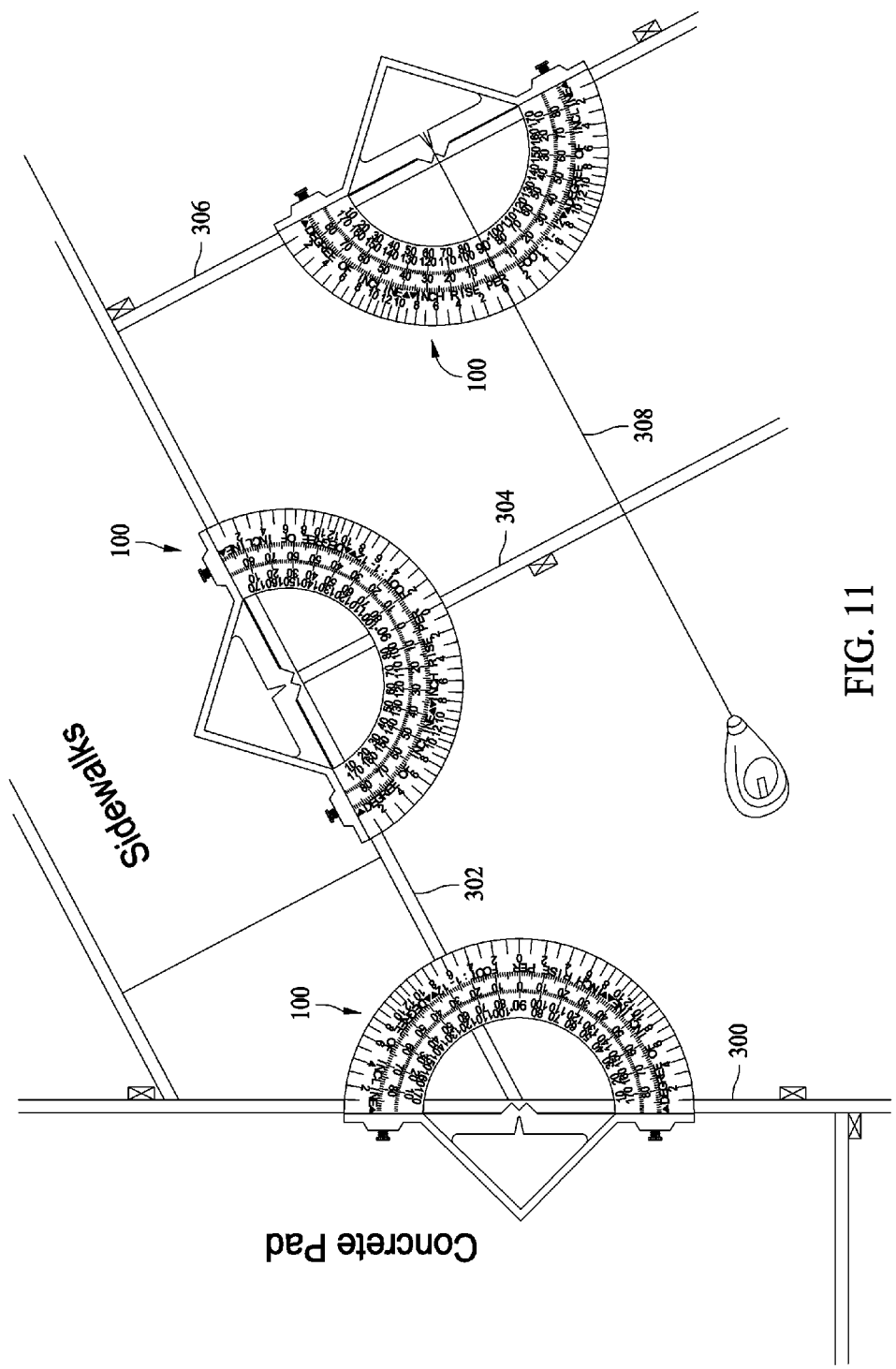
FIG. 11 illustrates a second exemplary application of a tool according to the present invention.

FIG. 11 illustrates, for example, a concrete pad and sidewalk construction layout using the tool 100. First, the concrete frame 300 is set for pouring of the concrete pad. Next, the tool 100 is mounted to the frame 300 and a desired angle is set to place a frame 302 for the sidewalk in the manner described above in relation to FIG. 11. Once the frame 302 is set, the tool 100 may be mounted to the frame 302, and another angle may be set to mount further frame elements 304 and 306 for another portion of the sidewalk. Once the concrete is poured, the tool 100 may be mounted to the frame element 306 and used with a chalk line to use as a reference line with the tool to layout, for example, concrete cut lines to complete the sidewalk. Once again, because the tool 100 is anchored to the workpiece frames 300-306, the layout may be accomplished by only one person while still achieving great accuracy in the layout.

Figure 12:
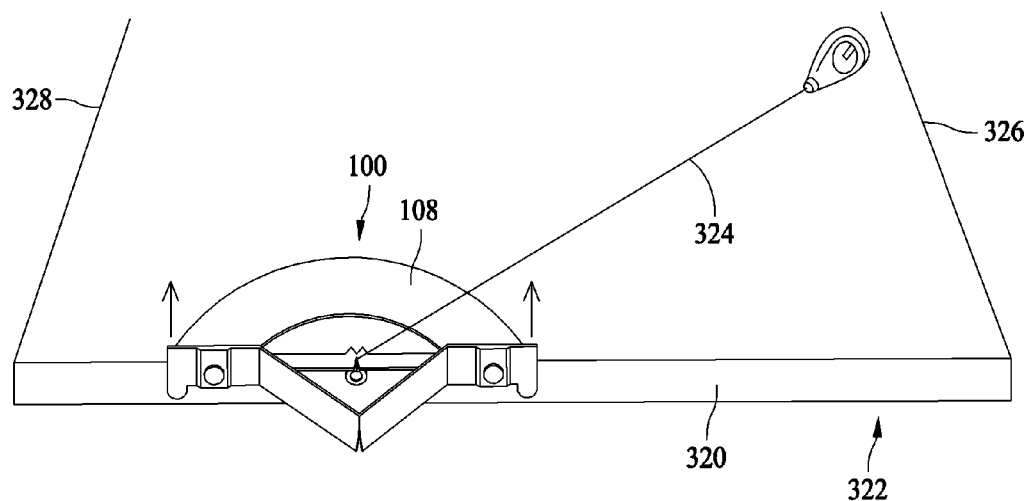
FIG. 12 illustrates a third exemplary application of a tool according to the present invention.

FIG. 12 illustrates the tool 100 mounted to a straight edge 320 of a sheet 322 of building material, such as, for example a sheet of drywall or plywood. The tool 100 is attached to the edge 320 as described above, and a chalk line 324 is used with the tool 100 to snap a cutting line for the sheet of material. The cut line may be quickly established by a single person in a direct manner without mathematical computation. The tool 100 could likewise be used on other edges 326, 328 of the sheet of material, and using the face 108 of the tool 100, angles could be pulled from left, right and center positions.

Figure 13:
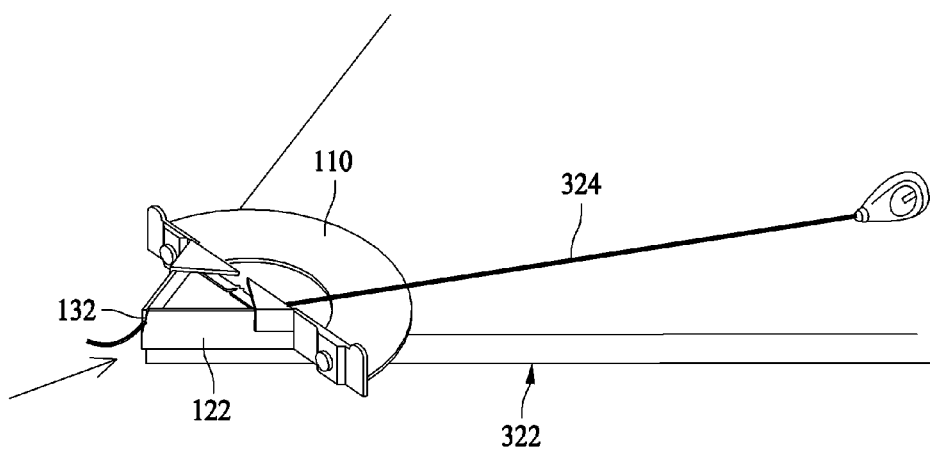
FIG. 13 illustrates a fourth exemplary application of a tool according to the present invention.

FIG. 13 illustrates the tool 100 mounted to a corner of a sheet 322 of building material, such as, for example a sheet of drywall or plywood. By coupling a chalk line 324 to the slot 132 of the corner bracket 122 and using the face 110, the chalk line may be aligned with the appropriate indicia on the face 110 to snap a cut line from the corner of the sheet. The cut line may be quickly established by a single person in a direct manner without mathematical computation. The tool 100 could likewise be used on other edges 326, 328 of the sheet of material, and using the face 108 of the tool 100, angles could be pulled from left, right and center positions.

Figure 14:
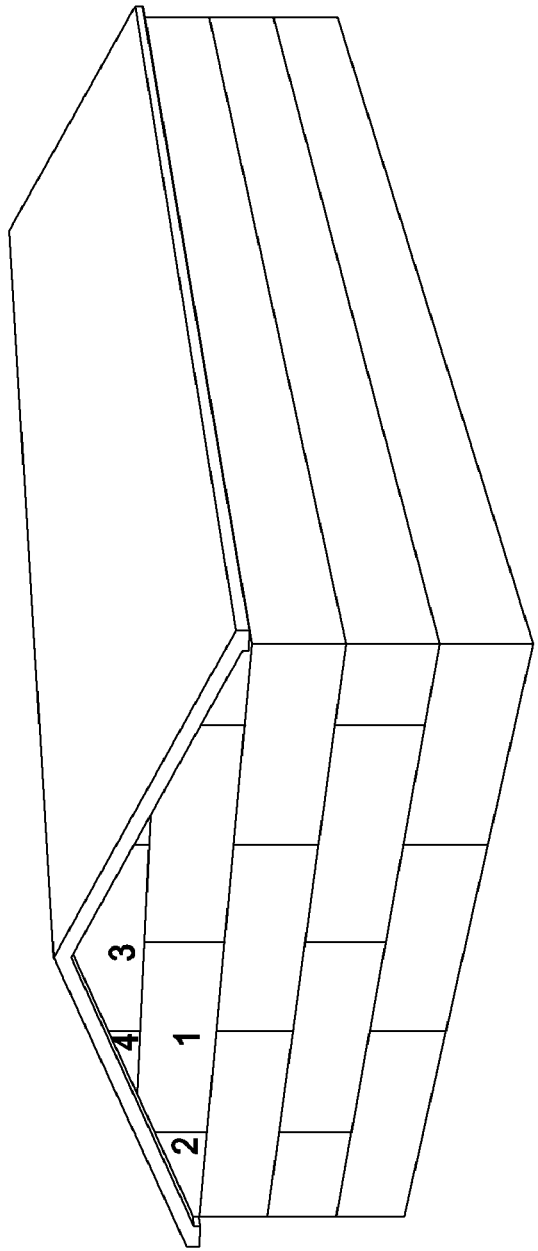
FIGS. 14 and 15 illustrates a sixth exemplary application of a tool according to the present invention.
Figure 15:
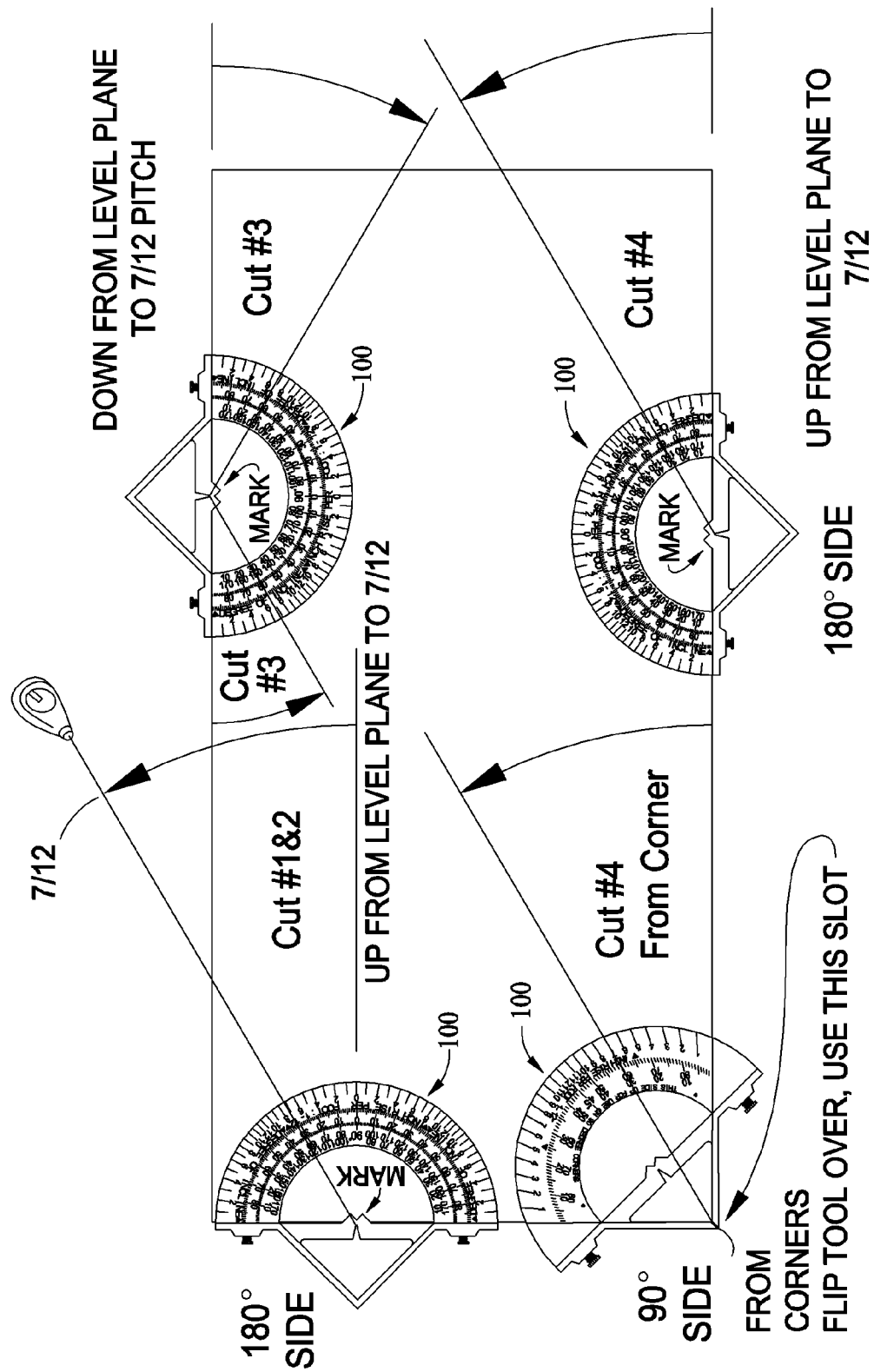

FIGS. 14 and 15 illustrate the tool being used to establish cuts to sheets of building material to match a roof pitch. In FIG. 15, the tool 100 is illustrated in various positions on a sheet of material to illustrate the cuts of the numbered panels illustrated in FIG. 14.

Figure 16:
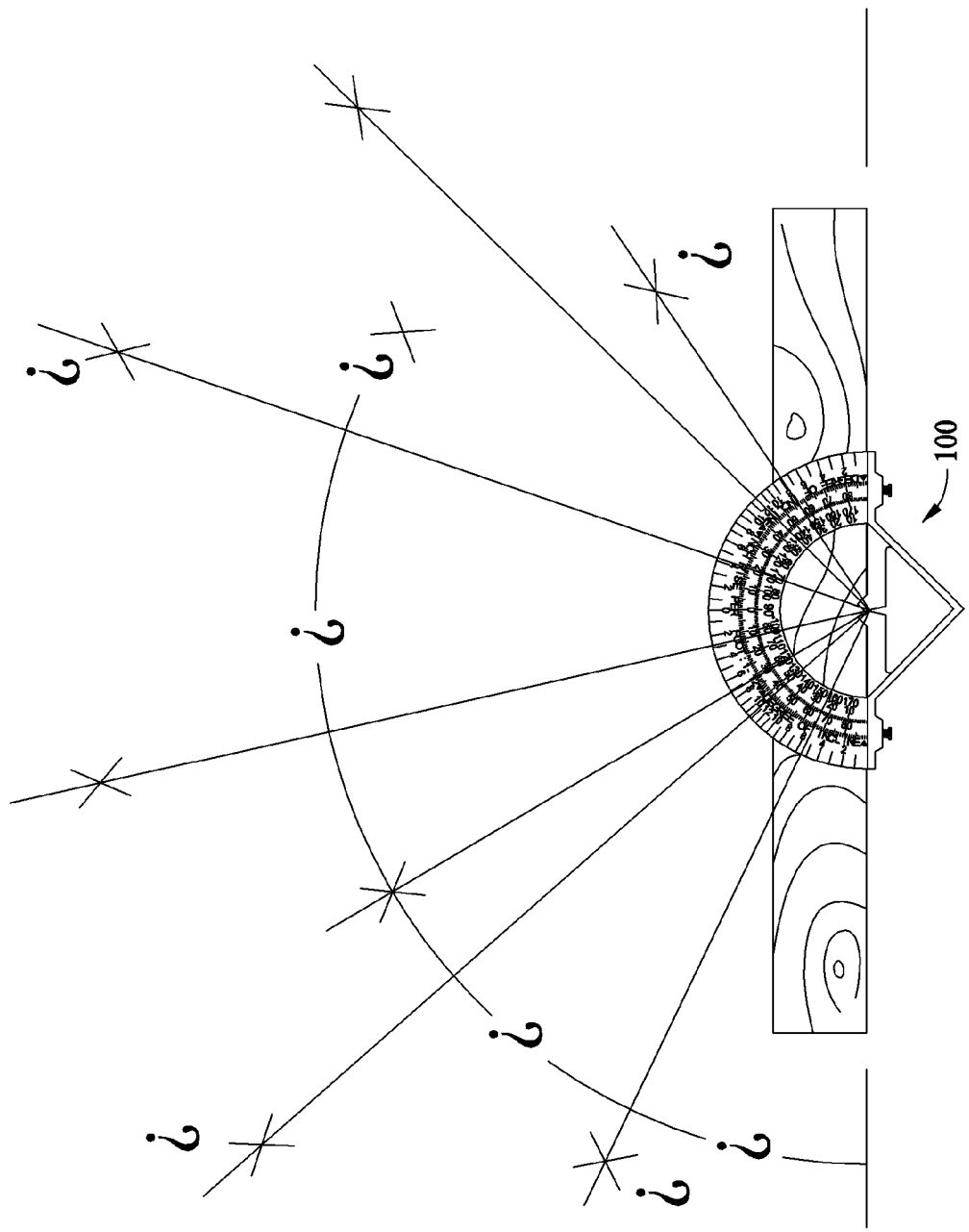
FIG. 16 illustrates a seventh exemplary application of a tool according to the present invention.

FIG. 16 illustrates the tool 100 mounted in a desired location, and once mounted, the tool 100 may be used with a string line to determine the angular position of any object or location relative the tool 100. Thus, unknown angles may be determined directly without mathematical computation, and the unknown angles may be determined by only person without the assistance of others.

Figure 17:
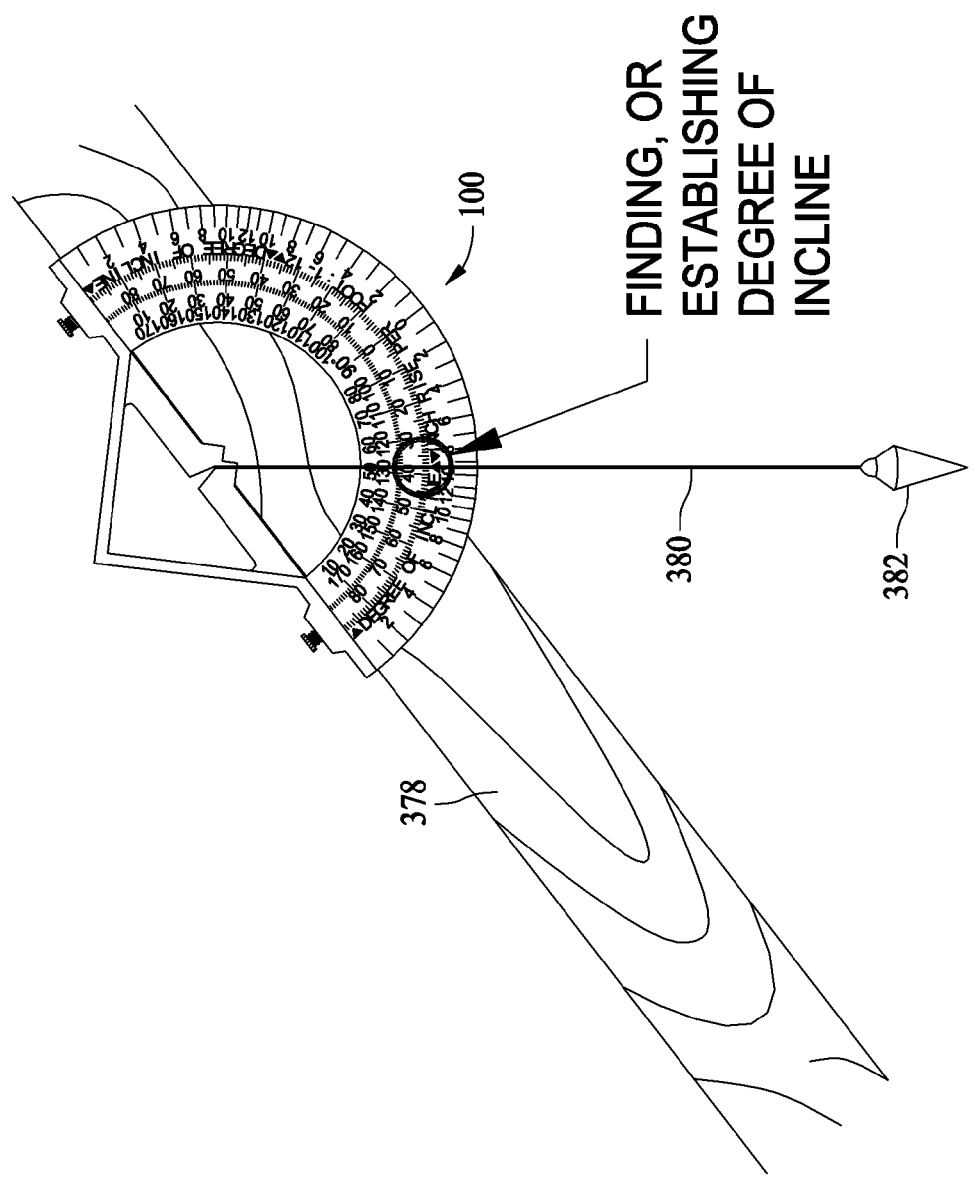
FIG. 17 illustrates a seventh exemplary application of a tool according to the present invention.

FIG. 17 illustrates the tool 100 mounted to an inclined workpiece, such as a rafter, and when used with a string line and a plum bob 382. The angle, slope or pitch of the workpiece 378 may be directly determined by only one person, without the assistance of others and without mathematical computation. Similarly, when used with a plum bob 382, the tool 100 may be used as a level to layout or assess a horizontal position of a workpiece.

Figure 18:
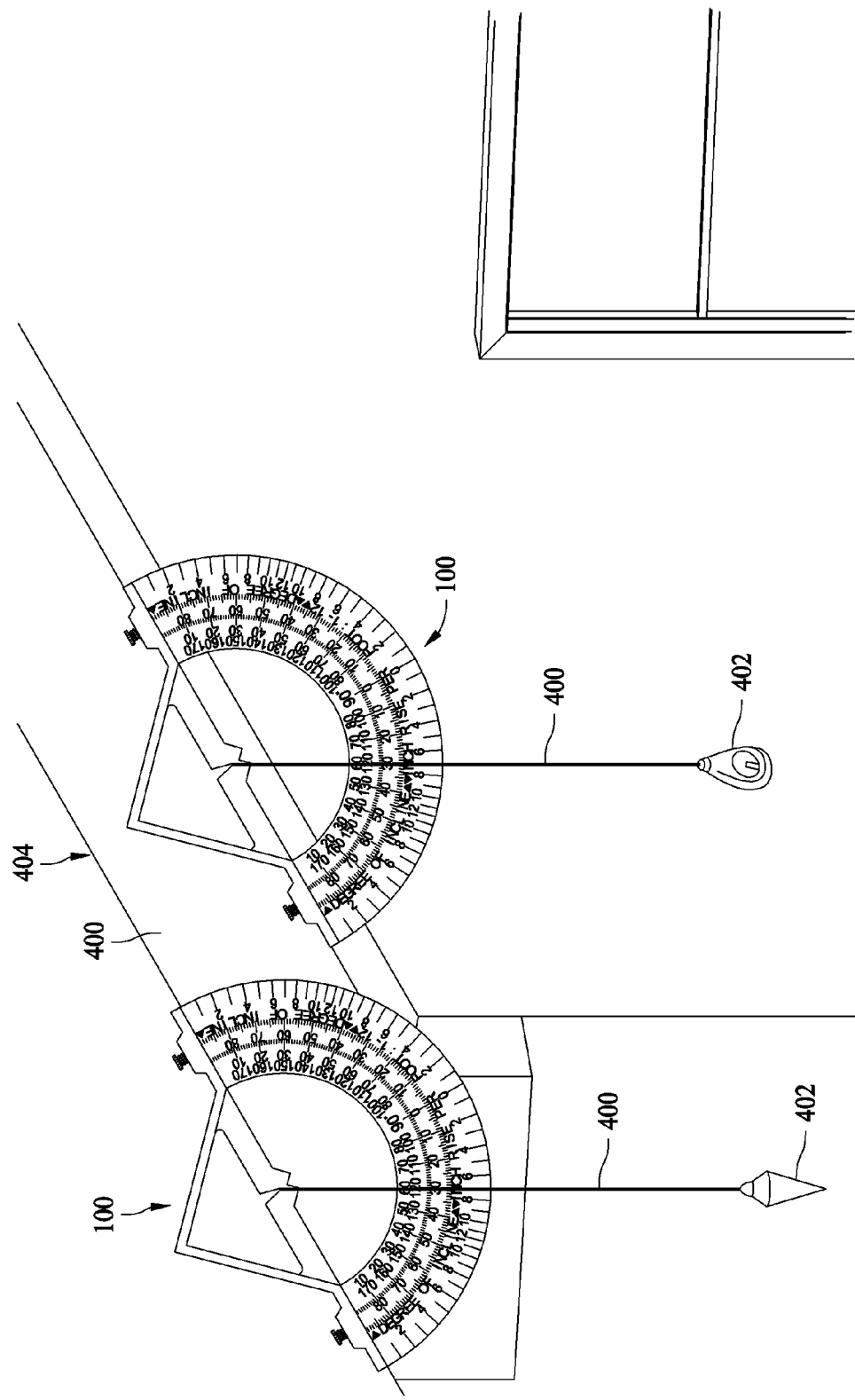
FIG. 18 illustrates an eighth exemplary application of a tool according to the present invention.

FIG. 18 illustrates the tool 100 mounted to an inclined workpiece, such as a soffit 400, and when used with a string line 402 and a plumbob 402. The angle, slope or pitch of a roof 404 may be directly determined by only one person, without the assistance of others and without mathematical computation. As illustrated in FIG. 18, the tool 100 may be mounted to the soffit 400 from above or below as desired or as needed for the roof structure.

Figure 19:
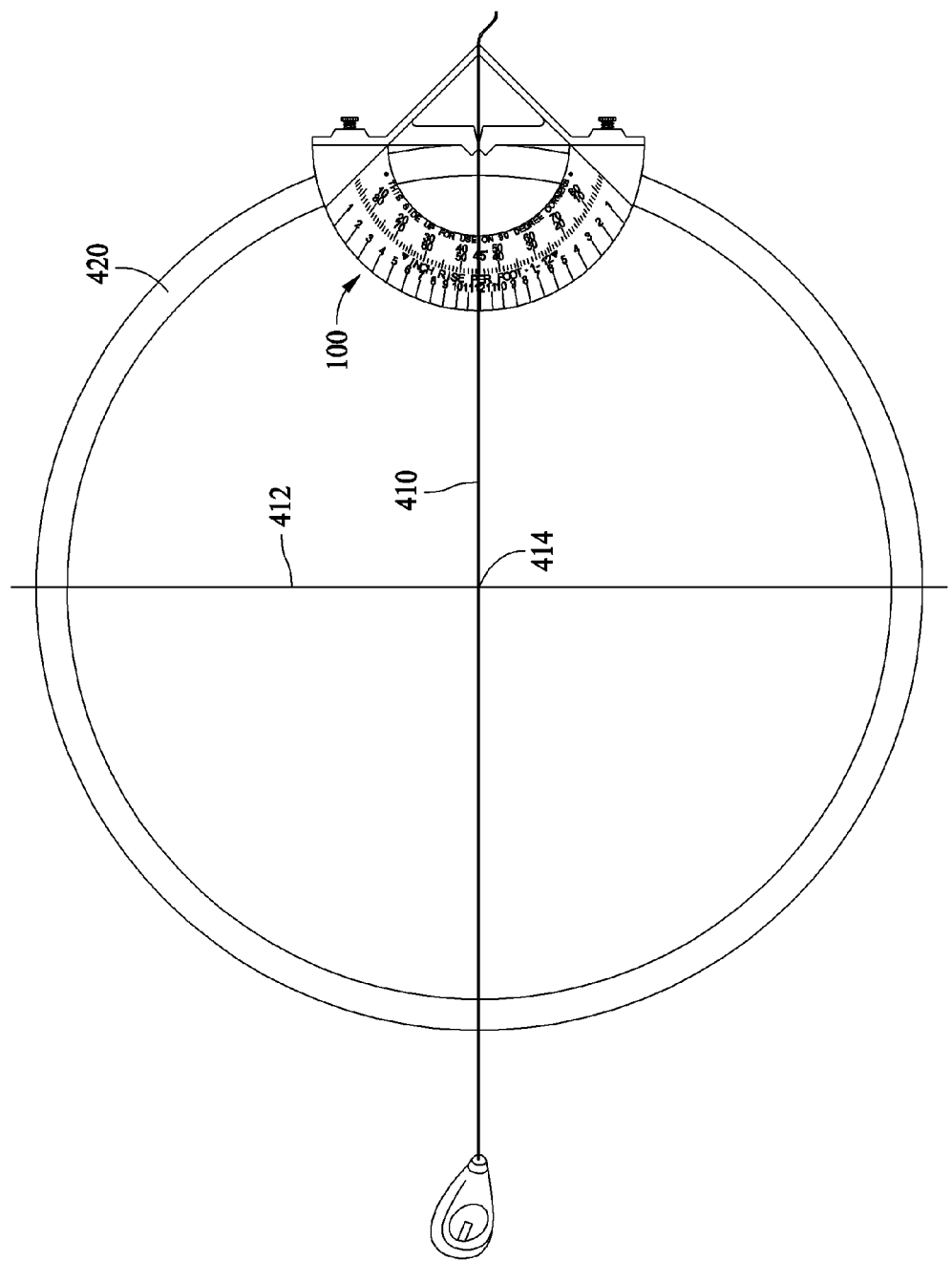
FIG. 19 illustrates a ninth exemplary application of a tool according to the present invention.

FIG. 19 illustrates the tool 100 being used to locate centerlines 410 and 412 of a construction arc or circle 420. Radial 410 and 412 centerlines may be quickly established, and the center 414 of the circle 420 may be located by intersecting the radial centerlines 410 and 412. Centers and centerlines may therefore be efficiently and accurately directly determined by only one person, without the assistance of others and without mathematical computation.

Figure 20:
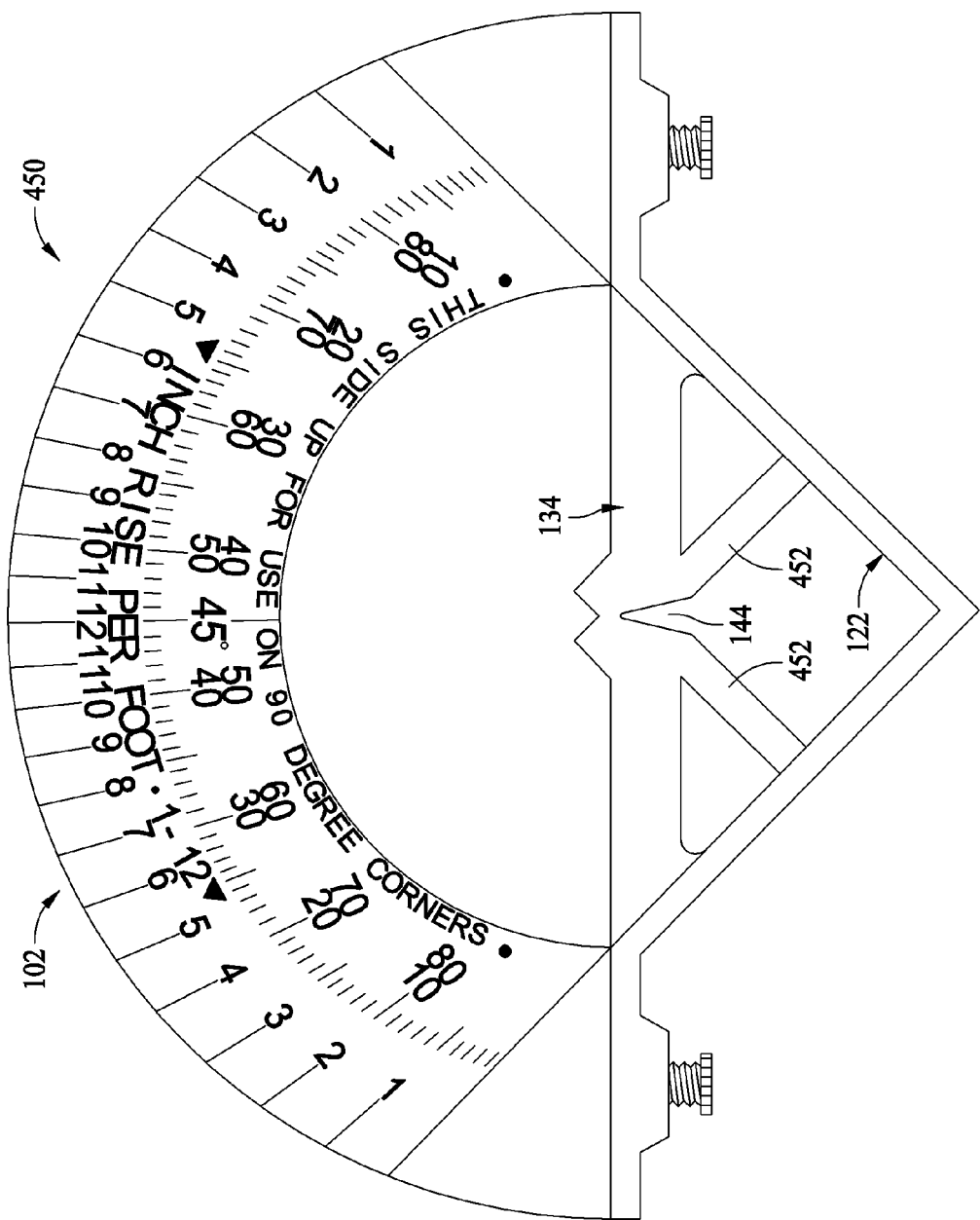
FIG. 20 illustrates another embodiment of a tool according to an exemplary embodiment of the invention.

FIG. 20 illustrates another embodiment of a tool 450 including reinforcing truss bars 452 supporting the cross member 134 above the corner bracket 122. With the addition of the truss bars 452, the cross member 134 is less likely to be bent or misaligned with respect to the corner bracket 122 or the guide portion 102 in use, particularly when a reference line is pulled from the slot 144 across the guide portion 102 and the reference line is pulled taut against the cross member 134. Thus, the cross member 134 may more capably withstand substantial force which the tool may be subjected to in use.

A universal angle measurement and layout tool is therefore provided which overcomes the problems associated with existing tools and simplifies construction layout, evaluation and analysis by construction personnel. The tool may be provided at relatively low cost and is believed to benefit the construction process in a meaningful way. From professional to novice workers, the tool renders previously difficult tasks quite manageable, thereby saving, time, money, and aggravation to the construction process.

The tool 100 can be economically made in a number of processes, such as stamping, or numerous molding processes, or machining. The tool could be made of any suitable material, and may be produced in a variety of sizes and colors with varying scales and measurement indicia. This tool in its design for use on corners is self-adhering to the workpiece. When pulling on the string, the tool pulls snug onto the corner of the workpiece, providing a secure, and accurate line to the corner itself. Holes for pinning, barbs, or pinning apparatuses may be added to the tool to make it resistant to sliding when pulling along edges of applicable materials, and the tool could be made magnetic for steel applications.

While the invention has been described in terms of various specific embodiments, those skilled in the art will recognize that the invention can be practiced with modification within the spirit and scope of the claims.

What is claimed is:

1. An angle measurement and layout tool comprising:
   a support portion configured to seat against an edge of a construction workpiece;
   a guide portion extending from said support portion, the guide portion comprising an inner edge and an outer edge, at least one of the inner and outer edges extending as a substantially 180° arc over the support portion, said guide portion having opposite faces with each face having measurement indicia thereon, said measurement indicia differently arranged on each of said opposite faces with respect to a predetermined reference point located on the support portion; and
   one of the opposite faces being provided with a scale of angular indicia sufficient to directly measure an obtuse angle between 90° and 180° when the support portion is seated against the edge of the construction workpiece.

2. A tool in accordance with claim 1 wherein said support portion comprises a corner bracket constructed to accept a corner of the workpiece positioned within the corner bracket.

3. A tool in accordance with claim 1 wherein said support portion is attachable to an edge of the construction workpiece.

4. A tool in accordance with claim 3 wherein said support portion includes spring loaded fasteners operable to penetrate the edge of the construction workpiece.

5. A tool in accordance with claim 1 wherein said arc has a substantially constant radius of curvature.

6. A tool in accordance with claim 1 wherein each of said opposite faces of said guide portion include angular measurement indicia and slope indicia.

7. A tool in accordance with claim 6 wherein said angular measurement indicia and said slope indicia occupies a different area on each of said opposite faces of said guide portion.

8. A tool in accordance with claim 6 wherein said support portion comprises a corner bracket and a cross member, the corner bracket constructed to accept a corner of a workpiece inserted into the corner bracket, each of said corner bracket and said cross member defining a respective reference point for each of said opposite faces of said portion, said reference points of said corner bracket and said cross member being different from one another.

9. A tool in accordance with claim 1 wherein each of the inner and outer edges of the guide portion extend as a substantially 180 arc over the support portion.

10. A construction layout tool comprising:
    a support portion constructed to seat against an edge of a construction workpiece, said support portion comprising a flat ledge configured to seat against a workpiece and a corner bracket constructed to accept a portion of the workpiece positioned within the bracket; and
    a generally annular guide portion extending from said support portion, said guide portion having at least one face provided with layout measurement indicia thereon, the annular guide portion extending substantially 180° between a first end a second end.

11. A tool in accordance with claim 10 wherein said support portion further comprises fasteners operable to attach the tool to an edge of the workpiece.

12. A tool in accordance with claim 10 wherein said guide portion is substantially semicircular.

13. A tool in accordance with claim 10 wherein said guide portion comprises opposite faces, each of said opposite faces of said guide portion including measurement indicia, said measurement indicia of each of said sides of said guide portion being different from one another.

14. A tool in accordance with claim 10 wherein said guide portion comprises opposite faces, each of said opposite faces of said guide portion including measurement indicia, said measurement indicia occupying a different area on each of said opposite faces of said guide portion.

15. A tool in accordance with claim 10 further comprising at least one extension arm attachable to said corner bracket, a portion of said extension arm extending parallel to said ledge.

16. A construction layout tool comprising:
    a support portion constructed to seat against an edge of a construction workpiece, said support portion comprising a flat ledge configured to seat against a workpiece and a corner bracket constructed to accept a portion of the workpiece positioned within the bracket; and
    a guide portion extending from said support portion said guide portion having layout measurement indicia thereon;
    wherein said guide portion comprises opposite faces, said support portion including a first slot and a second slot spaced from said first slot, said first and second slots positioned relative to a respective one of said opposite faces of said guide portion to accurately measure angles when a reference line is extended from each of said first and second slots to a corresponding face of said guide portion.

17. A construction layout tool comprising:
    a support portion constructed to seat against an edge of a construction workpiece, said support portion comprising a flat ledge configured to scat against a workpiece and a corner bracket constructed to accept a portion of the workpiece positioned within the bracket; and
    a guide portion extending from said support portion, said guide portion having layout measurement indicia thereon;
    wherein the support portion defines a first attachment location and a second attachment location for a reference line extendible across the guide portion, the first and second attachment locations being different from one another.

18. A tool in accordance with claim 17, wherein at least one of the first and second attachment location comprises a slot.

19. An angle measurement and layout tool comprising:
    a support portion constructed to accept a corner of a workpiece positioned within the support portion; and
    an annular guide portion extending from said support portion, said guide portion having an inner edge and an outer edge defining a 180° arc across the support portion, said guide portion marked with measurement indicia corresponding to the corner of the workpiece, said measurement indicia including at least one of an angular degree indicia and slope indicia.

20. A tool in accordance with claim 19 wherein said measurement indicia comprises slope indicia having a first zero point and a second zero point, said slope indicia increasing from each of said zero points.

21. A tool in accordance with claim 19 wherein said measurement indicia comprises slope indicia having a first zero point and a second zero point, said slope indicia increasing from each of the zero points to a predetermined slope indicia, and decreasing toward each of the zero points from the predetermined slope indicia.

22. A tool in accordance with claim 19 wherein said slope indicia spans radially for approximately 90° on said guide portion.

23. An angle measurement and layout tool comprising:
a support portion configured to seat against an edge of a construction workpiece; and
a curved guide portion extending from said support portion and traversing an arcuate path that is at least about 180°, said guide portion comprising first and second edges, and opposite faces with each face having measurement indicia thereon, the measurement indicia on one of the opposite faces arranged to accommodate angle measurement of up to 180° from the first edge, up to 180° from the second edge, and up to 90° from a center position when the tool is located on a workpiece.

24. A tool in accordance with claim 23, wherein the measurement indicia comprises slope indicia.

25. An angle measurement and layout tool comprising:
a support portion mountable to a construction workpiece to fixedly locate the tool relative to the workpiece;
a guide portion extending from said support portion, said guide portion having an annular face with measurement indicia thereon, the measurement indicia spanning substantially more than 90° on the annular face;
a reference line coupled to the tool and extendable to a point of interest on a jobsite; and
the measurement indicia directly indicating an angle of the point of interest with respect to the tool where the reference line crosses the guide portion.

26. A tool in accordance with claim 25, wherein the measurement indicia includes at least angular measurement indicia and slope indicia.

27. A tool in accordance with claim 25, wherein the support portion comprises a corner mounting bracket constructed to receive a corner of the workpiece positioned within the corner mounting bracket.

28. A tool in accordance with claim 25, wherein the measurement indicia permits direct measurement of obtuse angles between 90° and 180°.

29. A tool in accordance with claim 25, wherein mathematical computation is not required to determine the angle.

30. An angle measurement and layout tool comprising:
a support portion mountable to a construction workpiece to fixedly locate the tool relative to the workpiece;
a guide portion extending from said support portion, said guide portion having a face with measurement indicia thereon; and
a reference line coupled to the tool;
wherein when the reference line is extended to a point of interest, the reference line is extended across the guide portion and the measurement indicia directly indicates an angle of the point of interest with respect to the tool, whereby measurement of the angle may be conducted by a sine person;
wherein the support portion comprises first and second slots for coupling of the reference line, the first and second slots spaced from one another.

31. A tool in accordance with claim 25, wherein the measurement indicia spans approximately 180° on the annular face.

32. An angle measurement and layout tool comprising:
a support portion fixedly mountable to a construction workpiece;
a guide portion extending from said support portion, said guide portion having a face with measurement indicia thereon, the guide portion having an inner edge and an outer edge, at least one of the inner and outer edges extending as a substantially 180° arc; and
a reference line coupled to the tool;
wherein the reference line may be extended across the face by a single person to evaluate and directly determine, without mathematical computation, an unknown orientation of the workpiece with respect to a designated portion of the worksite.

33. A tool in accordance with claim 32 wherein the orientation comprises one of a degree of incline, a pitch of a roof, an angle between two elements on the worksite, a location of a center of a circle, and a centerline location of an arc.

34. A tool in accordance with claim 32, wherein the support portion is mountable to a straight edge of the workpiece and to a corner of the workpiece.

35. A tool in accordance with claim 32, wherein the measurement indicia permits direct measurement of an obtuse angle.

36. A tool in accordance with claim 32, wherein each of the inner and outer edges extend as a substantially 180° arc.

37. A tool in accordance with claim 32, wherein the arc has a constant radius of curvature.

* * * * *